United States Patent
Zhou et al.

(10) Patent No.: US 12,383,957 B2
(45) Date of Patent: Aug. 12, 2025

(54) METHOD AND DEVICE FOR SHAPE-PERFORMANCE CONTROL BY ULTRASONIC ROLLING COMBINED WITH SELECTIVE LASER MELTING

(71) Applicant: Jiangsu University, Zhenjiang (CN)

(72) Inventors: Jianzhong Zhou, Zhenjiang (CN); Li Li, Zhenjiang (CN); Junling Wu, Zhenjiang (CN); Ling Dai, Zhenjiang (CN); Xiankai Meng, Zhenjiang (CN); Hongmei Zhang, Zhenjiang (CN); Pengfei Li, Zhenjiang (CN); Shu Huang, Zhenjiang (CN); Xu Feng, Zhenjiang (CN); Hansong Chen, Zhenjiang (CN)

(73) Assignee: Jiangsu University, Zhenjiang (CN)

( * ) Notice: Subject to any disclaimer, the term of this patent is extended or adjusted under 35 U.S.C. 154(b) by 0 days.

(21) Appl. No.: 18/892,997

(22) Filed: Sep. 23, 2024

(65) Prior Publication Data
US 2025/0073782 A1    Mar. 6, 2025

Related U.S. Application Data
(63) Continuation of application No. PCT/CN2024/095683, filed on May 28, 2024.

(30) Foreign Application Priority Data
Aug. 30, 2023  (CN) ............... 202311101142.2

(51) Int. Cl.
B22F 10/66  (2021.01)
B22F 3/16   (2006.01)
(Continued)

(52) U.S. Cl.
CPC ............... *B22F 10/66* (2021.01); *B22F 3/16* (2013.01); *B22F 10/28* (2021.01);
(Continued)

(58) Field of Classification Search
None
See application file for complete search history.

(56) References Cited

U.S. PATENT DOCUMENTS
2019/0084227 A1    3/2019  Paternoster et al.

FOREIGN PATENT DOCUMENTS
CN    107400887 A    11/2017
CN    107984754 A     5/2018
(Continued)

OTHER PUBLICATIONS

Sun et al, CN 113414413 A, English Translation from FIT (Year: 2021).*
(Continued)

*Primary Examiner* — Colin W. Slifka
(74) *Attorney, Agent, or Firm* — Pilloff Passino & Cosenza LLP; Rachel Pilloff; Sean Passino

(57) ABSTRACT

A method for shape-performance control by ultrasonic rolling combined with selective laser melting is provided, which includes following steps: S1, establishing a three-dimensional model of a component to be processed, and setting printing process parameters; S2, after nitrogen gas is filled into a forming cavity to reduce an oxygen content to a preset value, lowering a forming substrate and raising a powder substrate, laying powder from the powder substrate onto the forming substrate by a scraper, recovering excess powder, and after the laying is completed, melting the powder by a laser galvanometer to form a solid layer, and cycling for several times; S3, performing ultrasonic rolling on a surface of the solid layer; S4, cycling steps S2 and S3 until the (Continued)

component is formed, and ending the cycling; and S5, performing ultrasonic rolling on a surface of a formed component to obtain a solid component.

2 Claims, 6 Drawing Sheets

(51) Int. Cl.
  *B22F 10/28* (2021.01)
  *B33Y 10/00* (2015.01)
  *B33Y 40/20* (2020.01)
(52) U.S. Cl.
  CPC ........... *B22F 2201/02* (2013.01); *B33Y 10/00* (2014.12); *B33Y 40/20* (2020.01)

(56) References Cited

FOREIGN PATENT DOCUMENTS

| | | |
|---|---|---|
| CN | 108044932 A | 5/2018 |
| CN | 109070455 A | 12/2018 |
| CN | 110116207 A | 8/2019 |
| CN | 113414413 A | 9/2021 |
| CN | 215090702 U | 12/2021 |
| CN | 114682800 A | 7/2022 |
| CN | 116117163 A | 5/2023 |
| CN | 117102506 A | 11/2023 |
| EP | 3266543 A1 | 1/2018 |
| KR | 102435874 B1 | 8/2022 |

OTHER PUBLICATIONS

Lan et al, CN 114682800 A, English Translation from FIT (Year: 2022).*
First Office Action for China Application No. 202311101142.2, mailed Dec. 27, 2023.
International Search Report for PCT/CN2024/095683, mailed Sep. 9, 2024.
Notification to Grant Patent for China Application No. 202311101142.2, mailed Feb. 7, 2024.
First Search Report for China Application No. 202311101142.2, dated Dec. 22, 2023.
Supplementary Search Report for China Application No. 202311101142.2, dated Feb. 1, 2024.

* cited by examiner

METHOD AND DEVICE FOR SHAPE-PERFORMANCE CONTROL BY ULTRASONIC ROLLING COMBINED WITH SELECTIVE LASER MELTING

CROSS-REFERENCE TO RELATED APPLICATIONS

This application is a continuation of PCT/CN 2024/095683, filed on May 28, 2024, and claims priority to Chinese Patent Application No. 202311101142.2, filed on Aug. 30, 2023, the contents of which are hereby incorporated by reference.

TECHNICAL FIELD

The disclosure belongs to the technical field of additive manufacturing, and in particular relates to a method and a device for shape-performance control by ultrasonic rolling combined with selective laser melting.

BACKGROUND

After more than 20 years of development, metal additive manufacturing has become one of the fastest developing and most promising technologies in the field of advanced manufacturing. Metal additive manufacturing not only overcomes many inherent limitations in traditional production, but also significantly shortens the design and manufacturing time and reduces the waste of materials in production and manufacturing. However, metal additive manufacturing has some shortcomings such as high cost, long potential processing time and expensive powder raw materials.

Selective laser melting technology uses computer software to control a high-energy laser beam to selectively melt metal powder in a powder bed within a protective atmosphere according to a preset path, so as to realize layer-by-layer printing and stacking forming. Because the laser moves very fast, the molten metal solidifies rapidly, which inhibits the grain growth and the precipitation of alloy elements. In addition, the microstructure of the material is greatly refined due to the disturbance of marangoni flow in the molten pool, so the strength and toughness of the material are also increased accordingly. However, the rapid thermal cycle will produce sharp thermal gradient and possible metastable physical and chemical states, resulting in poor metallurgical defects, which is the key problem for the wide application of all metal additive manufacturing at present.

SUMMARY

An objective of the disclosure is to provide a method and a device for shape-performance control by ultrasonic rolling combined with selective laser melting, so as to solve the above problems and achieve the objectives of eliminating metallurgical defects generated in printing, improving the mechanical properties of the interior and surface of parts and increasing the practicability of the selective laser melting device.

In order to achieve the above objectives, the disclosure provides a following solution:
 a method for shape-performance control by ultrasonic rolling combined with selective laser melting, including following steps:

S1, establishing a three-dimensional model of a component to be processed, and setting printing process parameters;

S2, after nitrogen gas is filled into a forming cavity to reduce an oxygen content to a preset value, lowering a forming substrate and raising a powder substrate, laying powder from the powder substrate onto the forming substrate by a scraper, recovering excess powder, and after the laying is completed, melting the powder by a laser galvanometer to form a solid layer, and cycling for several times;

S3, performing ultrasonic rolling on a surface of the solid layer;

S4, cycling steps S2 and S3 until the component is formed, and ending the cycling; and S5, performing the ultrasonic rolling on a surface of a formed component to obtain a solid component.

Optionally, in step S1, three-dimensional modeling is performed on the component to be processed, the three-dimensional model is sliced by a slicing software, and slicing data and process parameters are input to a computer control center.

Optionally, in the step S2, high-purity nitrogen gas is introduced into the forming cavity, and after the oxygen content is reduced to the preset value, a printing program is started, the forming substrate is lowered by a fixed height H, and the powder substrate is raised by a height of 2H; the scraper lays the powder from the powder substrate onto the forming substrate and collects the excess powder into a recovery cylinder; after the laying of the powder is completed, the laser galvanometer performs selective laser melting on the powder on the forming substrate to obtain the solid layer and cycles for N times, and the printing program is suspended after generating N solid layers, and a number of the solid layers depends on a depth of an affected layer of residual stress of the ultrasonic rolling.

Optionally, in the step S3, an ultrasonic generator is started to perform the ultrasonic rolling on the surface of the solid layer so as to prepare a required component, and is reset after processing is completed.

A device for realizing the method for shape-performance control by ultrasonic rolling combined with selective laser melting, including a shell box, where the forming cavity is arranged in the shell box, the laser galvanometer is fixedly connected to a top wall of the forming cavity, an optical lens is fixedly connected to a bottom surface of the laser galvanometer, an ultrasonic rolling assembly is arranged in the forming cavity, and the optical lens and the ultrasonic rolling assembly are located above the forming substrate; the scraper is slidably connected in the forming cavity, a bottom end of the scraper is in sliding contact with a bottom wall of the forming cavity, and the scraper is located above the forming substrate and the powder substrate, and the forming substrate and the powder substrate are both slidably connected in a powder part; and the laser galvanometer and the ultrasonic rolling assembly are electrically connected with the computer control center.

Optionally, the powder part includes a powder cylinder, a forming cylinder and a recovery cylinder which are fixedly connected in the shell box; the powder cylinder, the forming cylinder and the recovery cylinder are sequentially arranged along a powder laying direction; the forming substrate is slidably connected to an inner side wall of the forming cylinder, and the powder substrate is slidably connected to an inner side wall of the powder cylinder; each of a bottom end of the powder substrate and a bottom end the forming substrate is fixedly connected to one end of a transmission rod, and an other end of the transmission rod is in transmission connection with a lifting part.

Optionally, the lifting part includes a second slider fixedly connected to a bottom end of the transmission rod, and the second slider is in transmission connection with a second servo motor through a second lead screw; the second slider is slidably connected to a guide rail, and the guide rail is fixedly connected to an inner side wall of the shell box.

Optionally, one end of the scraper is fixedly connected to a first slider, and the first slider is in transmission connection with a first lead screw through a first servo motor, and the first slider is slidably connected to a slide rail, and the slide rail is fixedly connected to a side wall of the forming cavity.

Optionally, the ultrasonic rolling assembly includes an ultrasonic generator and a mechanical arm fixedly connected to the side wall of the forming cavity, the ultrasonic generator is electrically connected to the computer control center; an end of the mechanical arm is fixedly connected with a transducer, and the transducer is electrically connected to the computer control center; a bottom end of the transducer is threadedly connected with an amplitude transformer, one end of the amplitude transformer away from the transducer is fixedly connected with a rolling head, and the rolling head is arranged in up-and-down correspondence with the forming substrate.

Compared with the prior art, the disclosure has following advantages and technical effects.

Firstly, the selective laser melting and ultrasonic rolling of the disclosure are repeated several times, and through the layer-by-layer ultrasonic rolling texturing treatment, not only plastic deformation can be generated to eliminate internal stress and metallurgical defects, but also laser absorption rate can be improved, bonding strength between layers can be enhanced, and additive manufacturing forming components with high performance can be obtained.

Secondly, the ultrasonic rolling finishing treatment can not only obtain a smooth surface, but also effectively improve the mechanical properties of the surface layer, avoiding complicated post-treatment means.

Thirdly, the whole process is fully automated, which reduces the waste of manpower, the work efficiency is improved, the safety of users is ensured, the overall mechanical properties of the formed components manufactured by additives are improved, and overall economy, safety, work efficiency, accuracy and practicability are high.

BRIEF DESCRIPTION OF THE DRAWINGS

In order to explain the embodiments of the disclosure or the technical solution in the prior art more clearly, the drawings needed in the embodiments will be briefly introduced below. Obviously, the drawings in the following description are only some embodiments of the disclosure. For those of ordinary skill in the art, other drawings may be obtained according to these drawings without creative efforts.

DETAILED DESCRIPTION OF THE EMBODIMENTS

Figure 1:
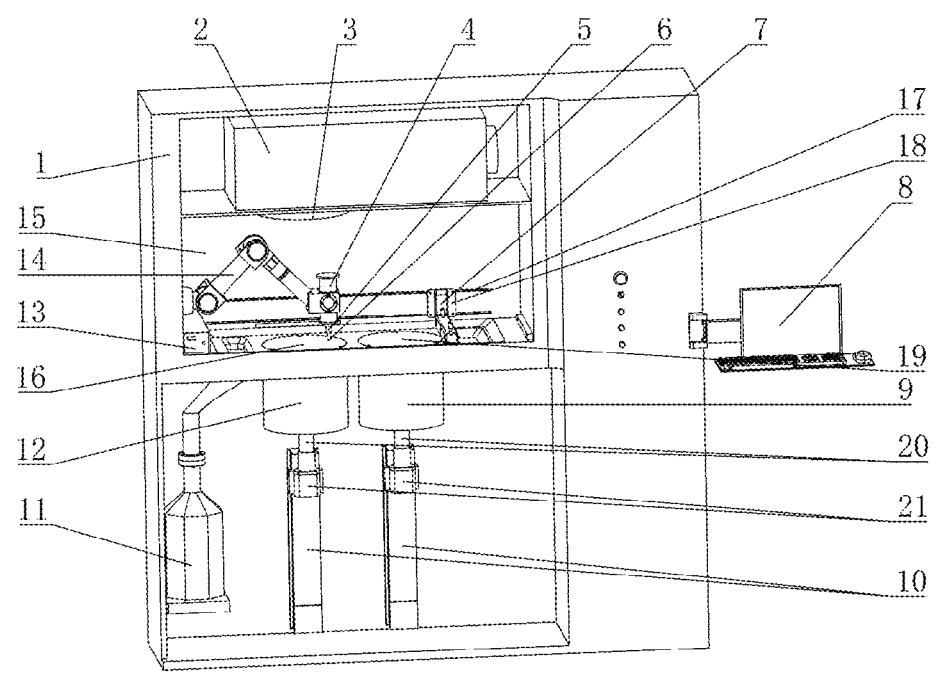
FIG. 1 is a schematic diagram of an overall structure according to the disclosure.
Figure 2:
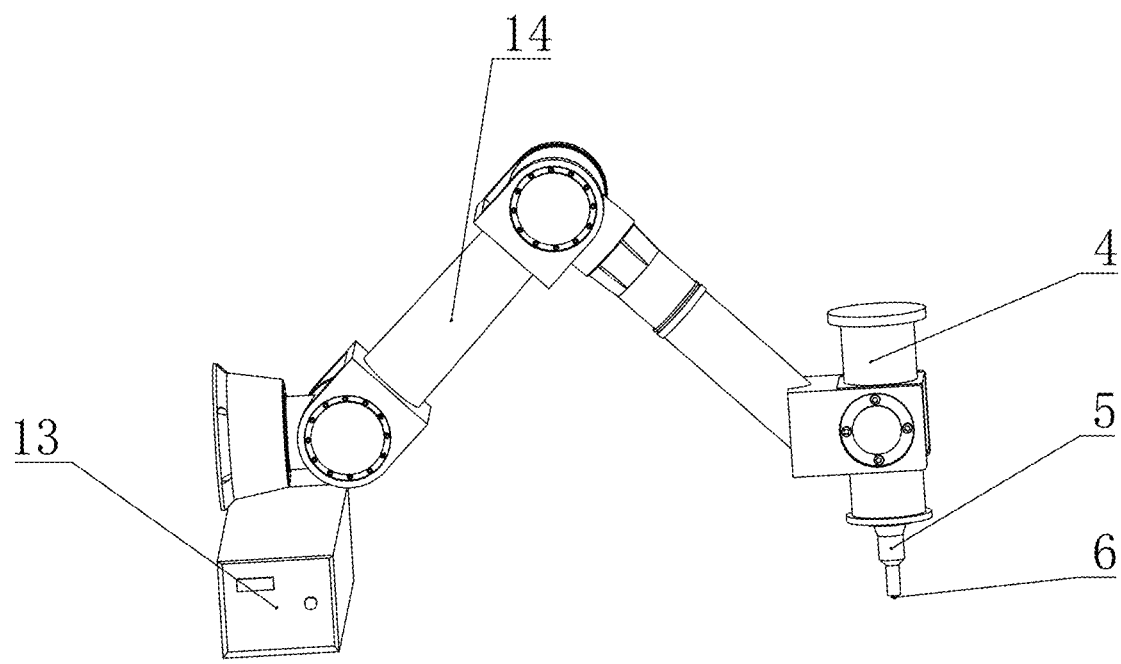
FIG. 2 is a structural schematic view of an ultrasonic rolling assembly.
Figure 3:
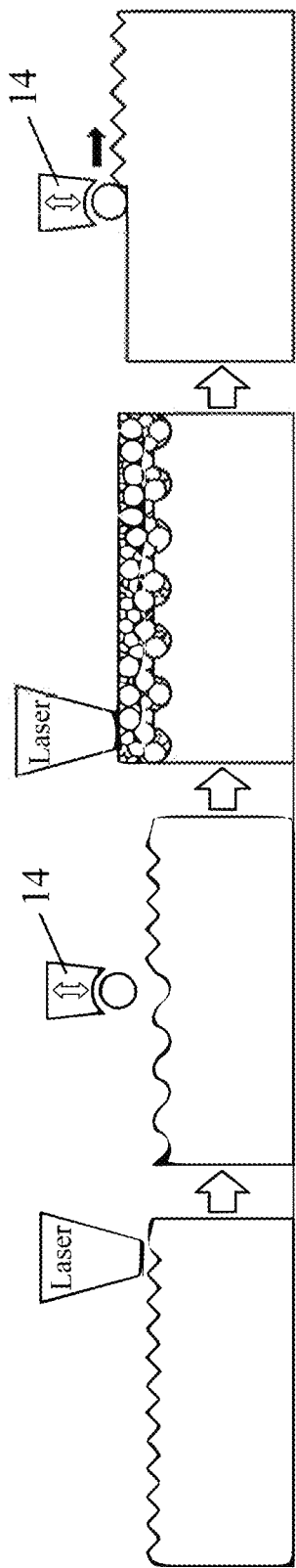
FIG. 3 is a schematic diagram of a process method according to the disclosure.

In the following, the technical solution in the embodiment of the disclosure will be clearly and completely described with reference to the attached drawings. Apparently, the described embodiments are only a part of the embodiments of the disclosure, but not all the embodiments. Based on the embodiments in the disclosure, all other embodiments obtained by those of ordinary skill in the art without creative effort belong to the protection scope of the disclosure.

In order to make the above objects, features and advantages of the disclosure more obvious and easier to understand, the disclosure will be further described in detail with the attached drawings and specific embodiments.

With reference to FIG. 1 to FIG. 6, the disclosure provides a method for shape-performance control by ultrasonic rolling combined with selective laser melting, including following steps.

Step 1, a three-dimensional model of a component to be processed is established, and printing process parameters are set;

Step 2, after nitrogen gas is filled into a forming cavity 15 to reduce an oxygen content to a preset value, a forming substrate 16 is lowered and a powder substrate 19 is raised, powder from the powder substrate 19 is laid onto the forming substrate 16 by a scraper 7, excess powder is recovered; and after the laying is completed, the powder is melted by a laser galvanometer 2 to form a solid layer, and the step 2 is repeated cyclically several times.

Step 3, ultrasonic rolling is performed on a surface of the solid layer.

Step 4, the steps 2 and 3 are repeated cyclically until the component is formed, and repetition is ended.

Step 5, the ultrasonic rolling is performed on a surface of a formed component to obtain a solid component.

In an embodiment, in the step 1, three-dimensional modeling is performed on the component to be processed, the three-dimensional model is sliced by a slicing software, and slicing data and process parameters are input to a computer control center 8.

In an embodiment, in the step 2, high-purity nitrogen gas is introduced into the forming cavity 15, and after the oxygen content is reduced to the preset value, a printing program is started. The forming substrate 16 is lowered by a fixed height H, and the powder substrate 19 is raised by a height of 2H; the scraper 7 lays the powder from the powder substrate 19 onto the forming substrate 16 and collects the excess powder into a recovery cylinder 11. And after the laying of the powder is completed, the laser galvanometer 2 performs selective laser melting on the powder on the forming substrate 16 to obtain the solid layer, and the above processes are repeated cyclically for N times. The printing program is suspended after generating N solid layers, and the number of the solid layers depends on the depth of an affected layer of residual stress of the ultrasonic rolling.

In an embodiment, in the step 3, an ultrasonic generator 13 is started to perform the ultrasonic rolling on the surface of the solid layer to prepare a required component, and is reset after processing is completed.

In the step 1, a computer is used to perform the three-dimensional modeling on the component to be processed, and the three-dimensional model is imported into the slicing software for model slicing treatment so as to obtain a STL format file. Selective laser melting and ultrasonic rolling process parameters of a material to be printed are set according to the processing experience, and a selective laser melting printing program and an ultrasonic rolling processing program are compiled and uniformly input to the computer control center 8.

In the step 3, the ultrasonic rolling is performed on the surface of the forming substrate 16 to prepare a periodic micro-textured surface, and the textured surface can provide better bonding performance between layers and improve the density and mechanical properties of the first N layers of formed solid. The micro-textured surface morphology may be grooves, circular pits, V-shaped pits and grids, with an average peak-valley height of 2-30 micrometre (μm) and a texture width of 50-200 μm.

In the step 5, a smooth metal surface is prepared by performing the ultrasonic rolling on the surface of the formed component again, and the solid component with good surface accuracy and overall performance is obtained.

In the step 2, the powder is special spherical powder for selective laser melting, which may be aluminum alloy powder, titanium alloy powder and nickel-based alloy powder. The powder has a particle size of 15-53 μm, which has good fluidity and high loose density.

The laser galvanometer 2 has a laser energy of 100-500 watt (W), a scanning speed of 200-2000 millimeters/second (mm/s), a layer thickness of 30-50 μm, a scanning interval of 80-100 μm, and an island scanning strategy.

In the step 3, an indenter of the ultrasonic rolling may be a ball, a pin roller, a roller, etc. The ultrasonic rolling process parameters are: static pressure 200-1000 Newton (N), amplitude 5-30 μm and output frequency 18-22 kilohertz (KHz).

Figure 4:
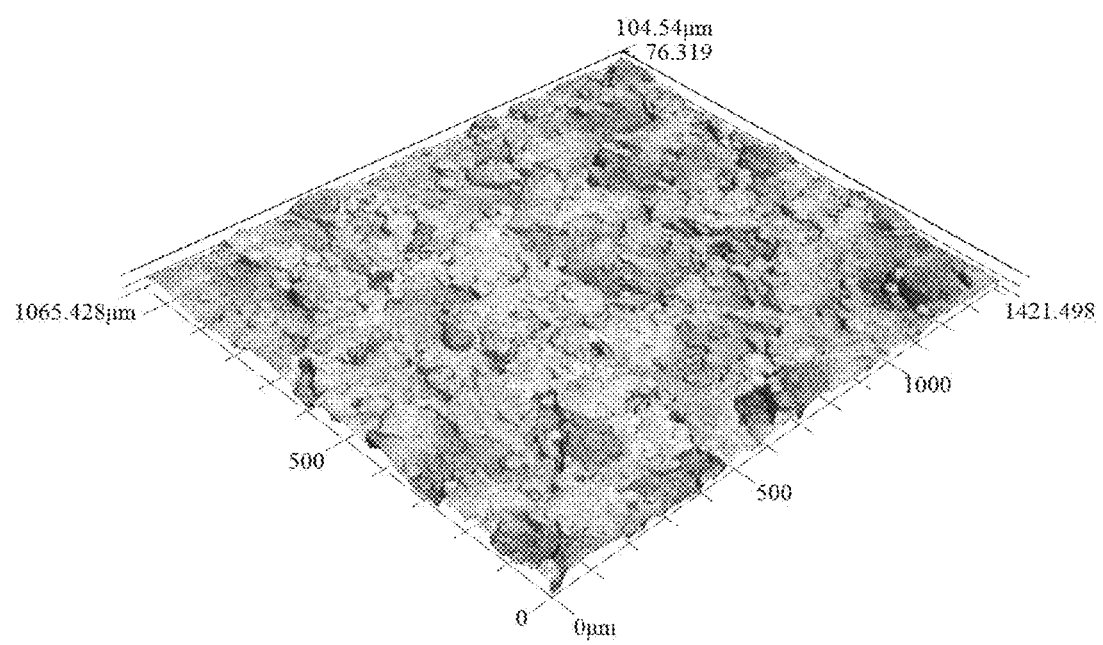
FIG. 4 is a surface morphology of a formed component obtained by the prior art.
Figure 5:
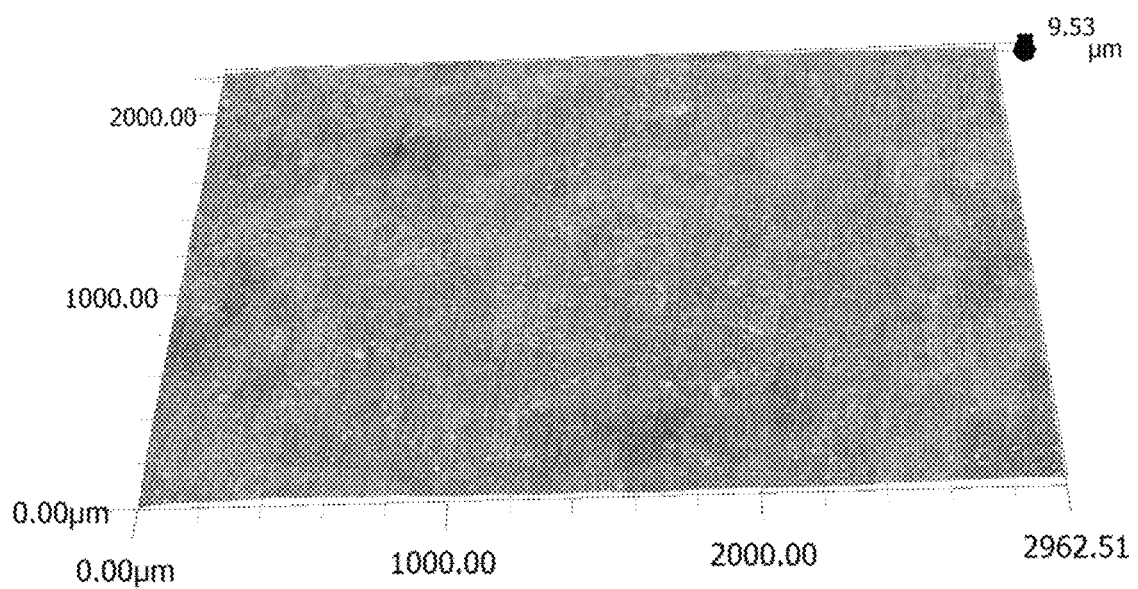
FIG. 5 is a surface morphology of a formed component obtained by the disclosure.
Figure 6:
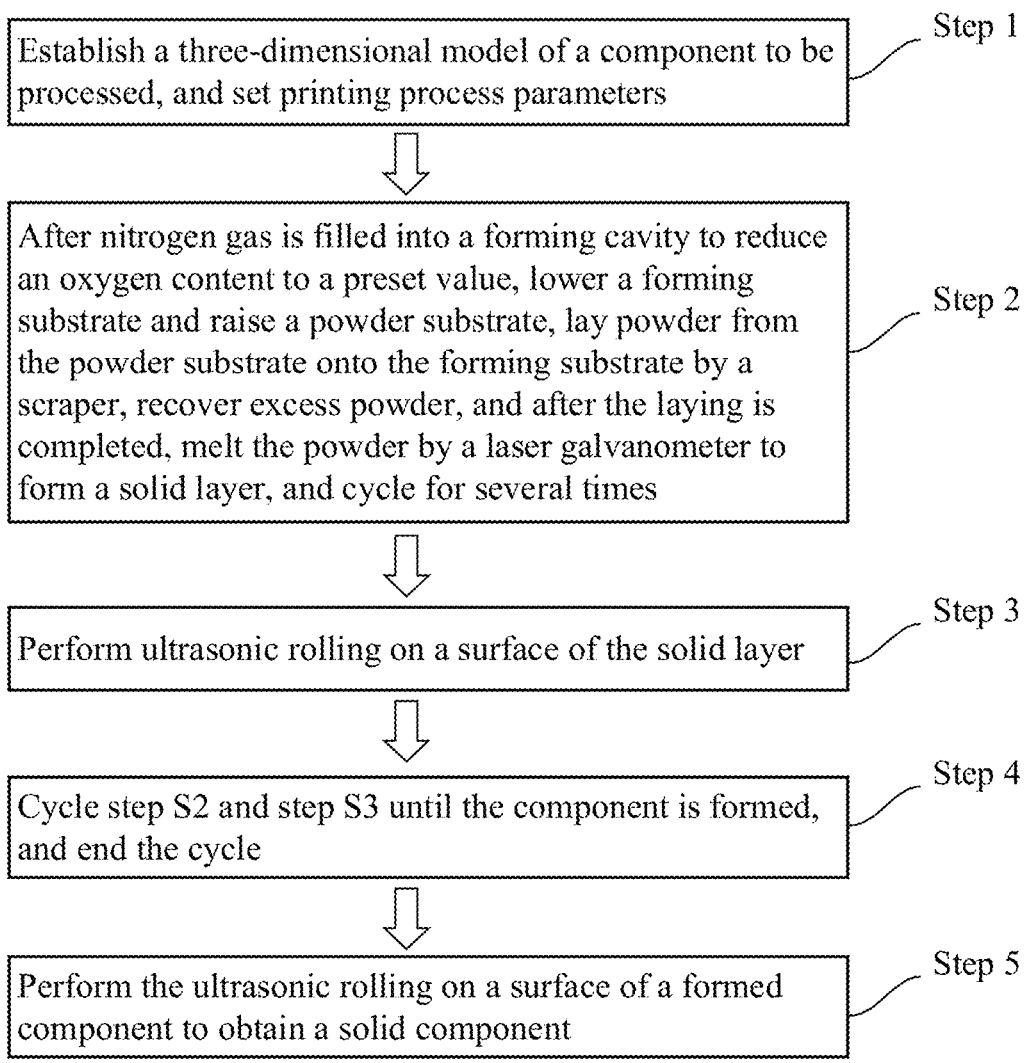
FIG. 6 is a schematic flow diagram of a method for shape-performance control by ultrasonic rolling combined with selective laser melting according to the disclosure.

With reference to FIG. 4 and FIG. 5, the ultrasonic rolling finishing treatment according to the embodiments of the disclosure can reduce the surface roughness to Ra 0.5 μm, so that the formed component has high surface accuracy and mechanical stability.

A device for the method for shape-performance control by ultrasonic rolling combined with selective laser melting is provided, which includes a shell box 1, where the forming cavity 15 is arranged in the shell box 1, the laser galvanometer 2 is fixedly connected to a top wall of the forming cavity 15, an optical lens 3 is fixedly connected to a bottom surface of the laser galvanometer 2, an ultrasonic rolling assembly is arranged in the forming cavity 15. The optical lens 3 and the ultrasonic rolling assembly are located above the forming substrate 16. And the scraper 7 is slidably connected in the forming cavity 15, a bottom end of the scraper 7 is in sliding contact with a bottom wall of the forming cavity 15, and the scraper 7 is located above the forming substrate 16 and the powder substrate 19, and the forming substrate 16 and the powder substrate 19 are both slidably connected in a powder part. The laser galvanometer 2 and the ultrasonic rolling assembly are electrically connected to the computer control center 8.

In an embodiment, the powder part includes a powder cylinder 9, a forming cylinder 12 and a recovery cylinder 11 which are fixedly connected inside the shell box 1. The powder cylinder 9, the forming cylinder 12 and the recovery cylinder 11 are sequentially arranged along a powder laying direction. The forming substrate 16 is slidably connected to an inner side wall of the forming cylinder 12, and the powder substrate 19 is slidably connected to an inner side wall of the powder cylinder 9. Bottom ends of the powder substrate 19 and the forming substrate 16 are fixedly connected to ends of transmission rods 20 respectively, and another end of the transmission rod 20 is in transmission connection with a lifting part.

In an embodiment, the lifting part includes a second slider 21 fixedly connected to a bottom end of the transmission rod 20, and the second slider 21 is in transmission connection with a second servo motor through a second lead screw. The second slider 21 is slidably connected to a guide rail 10, and the guide rail 10 is fixedly connected to an inner side wall of the shell box 1.

In an embodiment, one end of the scraper 7 is fixedly connected with a first slider 18, and the first slider 18 is in transmission connection with a first lead screw through a first servo motor, and the first slider 18 is slidably connected to a slide rail 17, where the slide rail 17 is fixedly connected to a side wall of the forming cavity 15.

The scraper 7 is controlled by the computer control center 8 to complete a powder laying action. The purpose of powder laying is firstly to detect whether the forming cylinder 12 is zeroed, and secondly to lay the powder in the powder cylinder flat and even.

In an embodiment, the ultrasonic rolling assembly includes an ultrasonic generator 13 and a mechanical arm 14 which are fixedly connected to the side wall of the forming cavity 15, and the ultrasonic generator 13 is electrically connected to the computer control center 8. An end of the mechanical arm 14 is fixedly connected with a transducer 4, and the transducer 4 is electrically connected to the computer control center 8. A bottom end of the transducer 4 is threadedly connected with an amplitude transformer 5, one end of the amplitude transformer 5 away from the transducer 4 is fixedly connected with a rolling head 6, and the rolling head 6 is arranged in up-and-down correspondence with the forming substrate 16.

The working process of the disclosure is as follows.

A three-dimensional model of a part to be processed is established, and the CAD three-dimensional model of the part to be processed is preprocessed by the slicing software, including slicing, repairing, supporting and layout on the forming substrate 16. The laser energy of 200 W, scanning speed of 1000 mm/s, scanning interval of 80 μm and layer thickness of 30 μm are adopted. Then, 25 layers are selected as a unit for slicing data packaging, and movement parameters of the mechanical arm 14 and parameters of the ultrasonic rolling device are added to the packaged data, including static pressure of 800 N and 200 N, amplitude of 20 μm, output frequency of 20 KHz and bow-shaped path planning. When finished, the STL file is imported into the computer control center 8 of the selective laser melting device.

The power supply of the selective laser melting device is turned on, the descending depth of the powder substrate 19 is controlled to be 2-2.5 times the height of the part to be molded, the powder cylinder 9 is filled with metal powder, and the powder is laid flat. Then, the forming substrate 16 is adjusted to be level with the bottom of the forming cavity 15, and one powder laying action is completed by the computer control center 8. The purpose of powder laying is firstly to detect whether the forming substrate 16 is zeroed, and secondly to lay the powder in the powder cylinder flat and even. When the forming substrate 16 is covered with a thin and uniform layer of metal powder, zeroing is completed, Then the bin door is closed, the gas circulation purification system is turned on for performing the deoxygenation procedure. A sensor is arranged in the forming cavity 15, and the oxygen content is displayed on the computer panel in real time. A vacuum pumping device pumps the forming cavity 15 into a low-pressure state, then an air delivery device fills the forming cavity 15 with helium gas, and the vacuum pumping device continues to be activated. This cycle is repeated until the oxygen content in the forming cavity 15 is lower than 800 parts per million (ppm), and then the machining process may be carried out.

The powder substrate 19 is first controlled by the computer control center 8 to rise by 60 μm, while at the same time the forming substrate 16 is lowered by 30 μm. Then, the scraper 7 moves from right to left to the leftmost side at a uniform speed to evenly lay the metal powder, higher than the plane, of the powder substrate 19 onto the forming substrate 16. Finally, the scraper 7 returns to the rightmost end to complete one powder laying, and then the metal powder is sintered into one solid layer by laser, and the surface morphology of the solid layer is shown in the first process in FIG. 3. Powder is laid once after one layer is formed, and this cycle is repeated. After every 25 layers of powder forming are completed, the powder laying system and the laser galvanometer 2 stop working and the ultrasonic rolling device starts to work. According to the processing data information, the computer control center 8 controls the mechanical arm 14 to drive the ultrasonic rolling device to move above the forming substrate 16 from the leftmost end of the forming cavity 15 to complete the given processing path and perform ultrasonic rolling surface texture treatment so as to obtain periodic transverse grooves on the surface of the processed part, as shown in the second process in FIG. 3. After the ultrasonic rolling surface texture treatment is completed, the mechanical arm 14 drives the ultrasonic rolling device to return to an initial position to complete an ultrasonic rolling. In this way, the laser machining and ultrasonic rolling machining processes are performed alternately until the entire process is completed. After all the solid part is printed, ultrasonic rolling finishing treatment is performed, as shown in the fourth process in FIG. 3, to obtain the solid part with good overall performance and surface performance. This process method largely solves the defects of low strength, voids, cracks and other defects in selective laser melting forming parts, and may obtain parts with high strength and smooth surface. In addition, in the process of ultrasonic rolling and texturing from the interior of the part, periodic transverse and longitudinal grooves can be obtained, which can reduce the reflectivity of the metal surface and improve the laser absorption rate and bonding strength between the layers of the metal.

In a description of the disclosure, it should be understood that orientation or positional relationships indicated by terms "longitudinal", "transverse", "up", "down", "front", "back", "left", "right", "vertical", "horizontal", "top", "bottom", "inside", "outside" are based on orientation or positional relationships shown in accompanying drawings, solely for a convenience of describing the disclosure, rather than indicating or implying that a device or a component referred to must have a specific orientation, be constructed and operated in a specific orientation, therefore it may not be understood as a limitation of the disclosure.

The above-mentioned embodiments only describe preferred modes of the disclosure, and do not limit a scope of the disclosure. Under a premise of not departing from a design spirit of the disclosure, various modifications and improvements made by those of ordinary skill in the art to the technical solution of the disclosure shall fall within a protection scope determined by claims of the disclosure.

What is claimed is:

1. A method for shape-performance control by ultrasonic rolling combined with selective laser melting, comprising following steps:
    S1, establishing a three-dimensional model of a component to be processed, and setting printing process parameters;
    S2, filling nitrogen gas into a forming cavity to reduce an oxygen content to a preset value, starting a printing program, lowering a forming substrate from a plane by a first distance and raising a powder substrate from the plane by a second distance, laying powder from the powder substrate onto the forming substrate by a scraper, recovering excess powder into a recovery cylinder, performing, by a laser galvanometer, selective laser melting on the powder on the forming substrate to form a solid layer after the laying is completed, and cycling for a plurality of times to generate a plurality of solid layers, and suspending the printing program, wherein the second distance is twice the first distance, and a number of the solid layers depends on a depth of an affected layer of residual stress of ultrasonic rolling;
    S3, performing, by an ultrasonic generator, the ultrasonic rolling on a surface of the plurality of solid layers, and resetting the ultrasonic generator after the ultrasonic rolling is completed;
    S4, cycling step S2 and step S3 until the component is formed, and ending the cycling, wherein the ultrasonic rolling is performed on the surface of the plurality of solid layers in a first cycle to form transverse grooves on the surface of the plurality of solid layers, the ultrasonic rolling is performed on a surface of another plurality of solid layers in a second cycle to form longitudinal grooves on the surface of the other plurality of solid layers, and the first cycle and the second cycle are repeated; and
    S5, performing the ultrasonic rolling on a surface of the formed component to obtain a solid component with a smooth surface.

2. The method for shape-performance control by ultrasonic rolling combined with selective laser melting according to claim 1, wherein in step S1, three-dimensional modeling is performed on the component to be processed, the three-dimensional model is sliced by a slicing software, and slicing data and process parameters are input to a computer control center.

* * * * *